Nov. 13, 1928.

J. S. REYNOLDS 1,691,083

VEHICLE BRAKE

Filed Oct. 10, 1925

INVENTOR.
Joy S. Reynolds

BY

ATTORNEY.

Nov. 13, 1928.
J. S. REYNOLDS
1,691,083
VEHICLE BRAKE
Filed Oct. 10, 1925
2 Sheets-Sheet 2
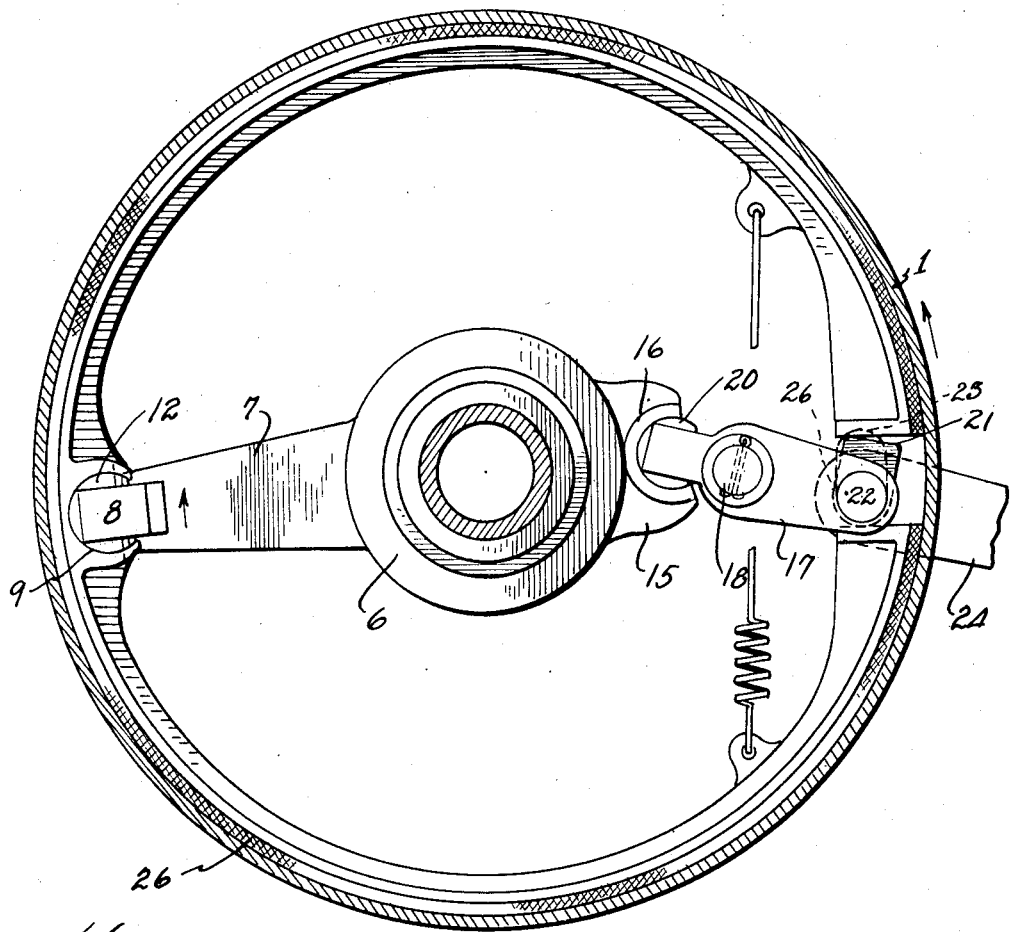
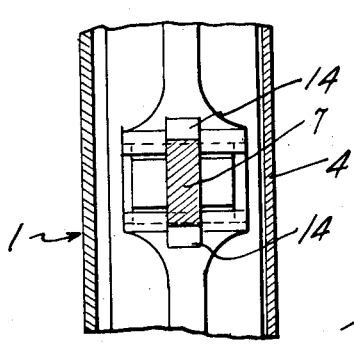
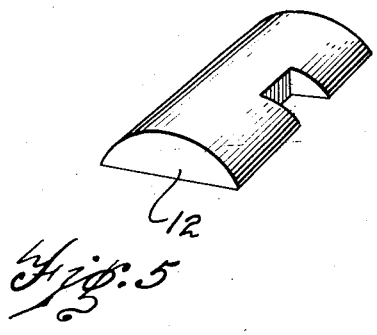
INVENTOR.
Joy S. Reynolds
BY
ATTORNEY.

Patented Nov. 13, 1928.

1,691,083

UNITED STATES PATENT OFFICE.

JOY S. REYNOLDS, OF DETROIT, MICHIGAN.

VEHICLE BRAKE.

Application filed October 10, 1925. Serial No. 61,653

This invention relates to vehicle brakes, and the purpose and object of the invention is to provide a simple and efficient brake mechanism of mechanically operated type involving a means for application of pressure at two points of the band in the direction of rotation of the drum with which the band is associated.

The novel features of the invention reside in the relationship of the parts by means of which the band is caused to engage the drum, the arrangement of the band to rotate or to turn with the drum to a limited extent and means utilizing the torque developed at two points on the band.
In the usual brake band, either of the internal expanding type or the external contracting type, practically one-half of the band is moved to engagement with the drum in the direction of rotation of the drum and the other half is moved in a direction opposite to the direction of rotation of the drum and therefore such previous types of brake band construction lack in efficiency. In the construction of brake band in accordance with my invention both halves of the band are brought to engagement with the drum in the direction of rotation of the drum. Therefore, what is known as the "wrapping" action is utilized thereby resulting in a higher efficiency per pound of pressure utilized in setting the brake. These and other objects and various novel features of the invention are more fully described and claimed, and a brake construction embodying my invention is shown in the accompanying drawings in which—

Fig. 3 is an elevation similar to Fig. 1 showing the position of the parts upon application of pressure to set the brake.
Fig. 4 is a section taken on line 4—4 of Fig. 1 showing the connection of the torque arm to the band.

Fig. 5 is a detail of the rocker block used at the point of connection of the torque arm to the band as hereinafter described.

I have here elected to show the internal expanding type of band, such type being most adaptable to utilization of my invention, but it is to be understood that the principle here involved may be utilized with bands other than the split internal expanding type as shown without departing from the spirit and scope of this invention.

Figure 1:
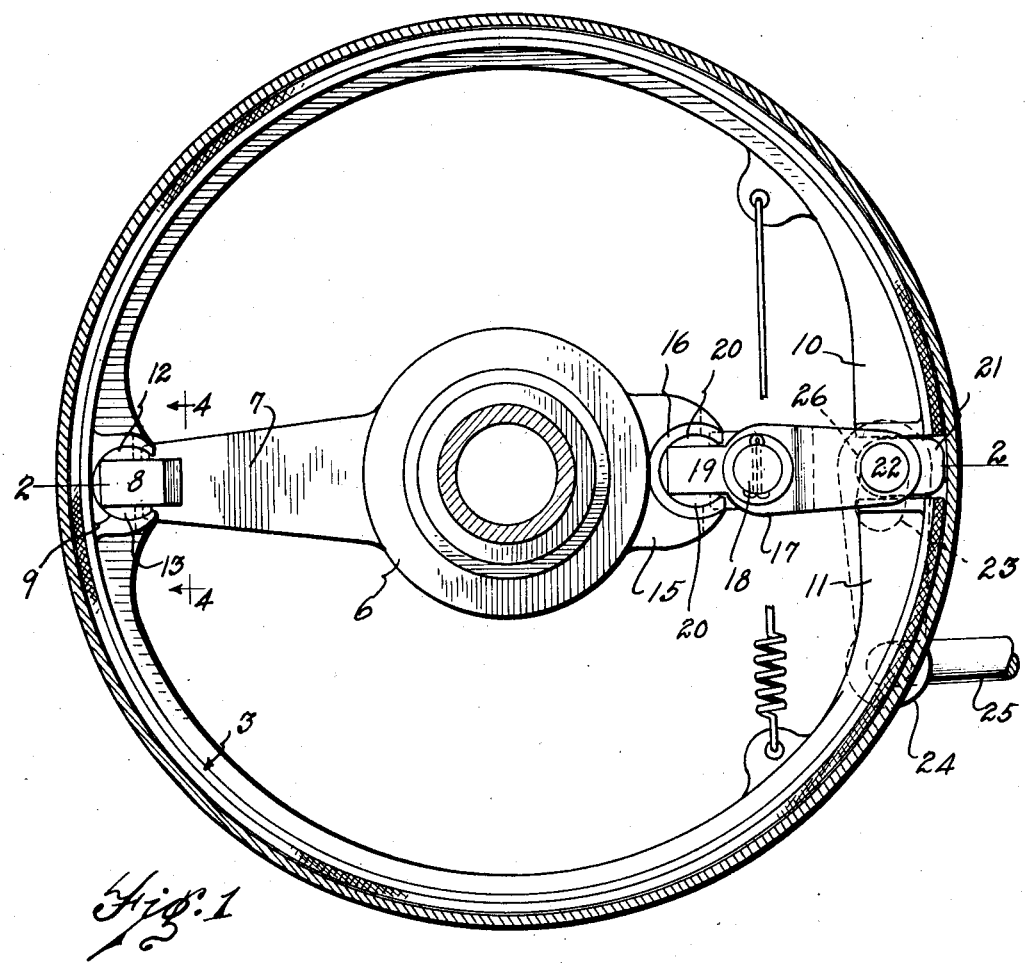
Fig. 1 is an elevation of a brake band of the internal expansion type embodying my invention.
Figure 2:
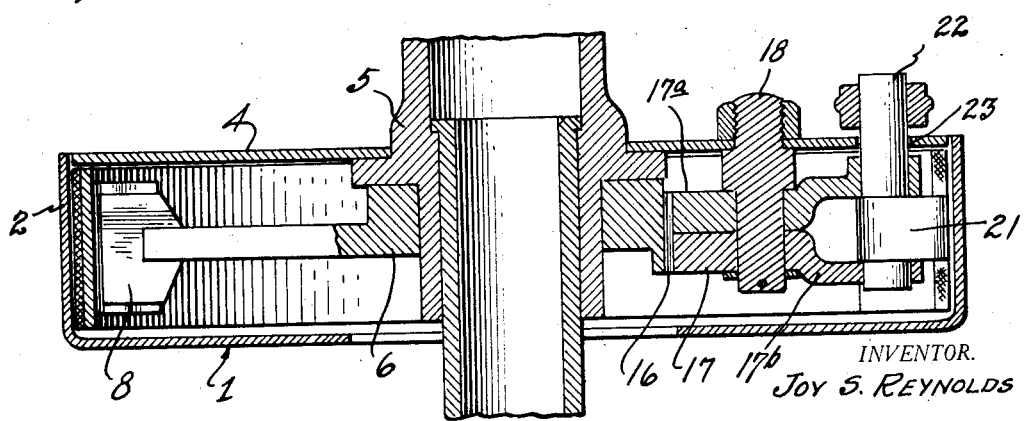
Fig. 2 is a section taken on line 2—2 of Fig. 1.

Referring more particularly to Fig. 2, the usual brake drum 1 is attached to the wheel of a vehicle, a portion of which is indicated in Fig. 1. The drum has the usual peripheral flange 2 and the brake band 3 is housed within this flange being covered by a cap plate 4 provided on one side of the drum fitting within the flange and secured to a stationary part 5 of the axle housing. Rotatably mounted upon this housing within the drum is the torque lever or arm 6, one end 7 of which is provided at the end with the flattened portion 8 lying within a cylindrical recess or socket 9 provided on the band at a point diametrically opposite the split portion thereof, the two ends being indicated at 10 and 11. This part 8 is rectangular in form having opposite parallel side faces and the rock blocks 12 and 13 are fitted between the flat faces and respective sides of the socket 9, the axis of which is parallel to the axis of the drum or wheel. As indicated in Fig. 4 the portion of the band in which this cylindrical aperture 9 is formed is slotted at 14 on opposite sides of the wall forming the recess and on the inner periphery to permit the portion of the arm 7 connecting with the part 8 to occupy a position as indicated in Fig. 3. The socket 9 is open on that side facing the center of the band which permits the block 8 to rock therein as is required in the movement of the arm from the position shown in Fig. 1 to that shown in Fig. 2. In its preferred form the opposite end 15 of the arm 6 is formed to provide a cylindrical socket 16 open on one side and similar in all general respects to the socket 9 and the length of the arm 15 from the center of the recess 16 to the axis of the drum is one-half the length of the arm 7 from the axis of the recess 9 to the axis of the drum. There is also a lever 17 which is supported on a stationary pivot 18 carried by the stationary plate 4 as shown in Fig. 2. This lever 17 has an end portion 19 formed with parallel sides extending into the recess 16 of the torque lever 6 as shown in Fig. 1 and there are rock blocks 20 similar to the blocks 12 provided on each side face of the portion 19 fitting this cylindrical aperture or socket 16. The socket 16 is open at one side to permit introduction of the portion 19.

As shown more particularly in Fig. 2 this lever 17 is formed of two parts indicated at 17ᵃ and 17ᵇ which are practically identical in form and together provide a lever having a bifurcated end. Between the legs of this bifurcated end is a cam 21 supported on or formed integrally with the shaft 22 which extends through an elongated opening 23 in the stationary plate 4 and through eyes in said bifurcated ends. To the projecting end of this shaft is secured the lever 24 connected with the brake operating rod 25 as shown in Fig. 1. It is to be noted from Fig. 1 that this cam 21 extends to one side only of the shaft 22 and that on the opposite side the portion 26 of the cam part is truly circular in form. This cam member 21 lies between the adjacent ends 10 and 11 of the brake band which has end portions shaped to engage the cam as will be understood from Fig. 1.

It is also to be understood that, upon the lever 24 and the brake rod 25 being moved to the right from the position shown in Fig. 1 to the position indicated by full lines in Fig. 4, the said cam portion will be moved against the end 10 of the said brake band tending to force it into engagement with the drum 1 which it is to be understood is rotating in the direction of the arrow shown in Fig. 3. Due to the elongated slot 23 there is possibility of movement of the cam shaft 22 to the position shown in Fig. 3 the lever 17 being turned on its pivot and thereby turning the lever 6 on its pivot. Due to this cam 21 being only one side of the shaft, the turning of the cam shaft 22 by the brake rod and lever, the part 10 of the brake band is moved to engagement with the drum in the direction of rotation of the drum. This movement tends to turn the band around with the drum with which it is free to turn to the extent permitted by the levers 6 and 17. The movement of the band with the drum causes the end 11 to exert pressure on the cam shaft tending to move it from the position shown in Fig. 3 and tending to move the end 7 of the torque arm 6 in the direction of the arrow shown thereon in Fig. 3. The actual position of the torque levers 6 and 17 immediately upon the turning of the cam 21 to the position shown in Fig. 3 will be between the extreme positions shown in Figs. 1 and 3 respectively and with the split ends 10 and 11 approximately equidistantly positioned on opposite sides of the diametrical line passing through the axis of the drum and axis of the pivot pin 18 and thus finally the cam shaft 22 provides a limit for movement of the end 11 with the drum and the effect of pressure in setting the lower half of the band will be through and by means of the end of the torque lever 6. The torque is thus applied at two points of the band at the point or end 10 of the band which in setting the brake causes the band to turn with the drum which in sequence causes the lever end 7 to turn and as the shaft 22 provides a stop for the end 11 of the brake band, that half of the band has the pressure actually applied through the lever arm 7 in the direction of rotation of the drum in the same manner as that half of the band having the end 10. Thus, the application of the torque or brake pressure at two points being in the direction of rotation of the drum advantage is taken of the "Wrapping" action resulting from the setting of the band on each half of the band equally. In former constructions utilizing the two point cam for spreading the free ends of an expanding type of brake band, one-half of the band is caused to be moved to its seat in the direction of rotation and other half in the direction opposite thereto so that the last mentioned part of the band is not as effective in its engagement with the drum as the first half. It is to obviate this inequality of pressure in the application of the brake that is dispensed with by the construction herein described.

Preferably the lever 17 from the center of the pivot point to the center of the socket 16 is one half the length of the lever from the center of the pivot pin to the center of the cam shaft. Thus, pressure of the band tending to turn the arm 17 on its pivot is applied at twice the pressure on the center of the recess 16 and this again is divided due to the relationship of the arm 15 and 7 so that at the point 8 the same pressure is applied as is applied at the point 22.

Preferably, and as is the usual practice, the face of the band is lined with a brake lining as indicated at 26 providing a proper character of surface for engagement with the inner face of the flange of the brake drum.

The application of pressure at two points of the band by the construction described is automatic in character and the brake is of the comparatively inexpensive, mechanically operated, type as distinguished from hydraulic types in use and by the arrangement described a greater efficiency in the braking element is secured. It is also evident that the device is simple and inexpensive in construction and is also of a character of minimum liability to get out of order.

Having thus fully described my invention, what I claim and desire to secure by Letters Patent of the United States is—

1. In a vehicle brake, the combination with a rotatable brake drum and stationary axle housing, of a plate mounted on the housing, a split internal expanding brake band within the drum, a lever within the drum pivoted on the said housing, a hinge connection between an end of the lever and the band at a point practically opposite the split point, a second lever, a stationary pivot therefor carried by the plate, a cam having a single point positioned between the two ends of the band, a shaft for the cam, the second lever having one end pivotally connected with the shaft a slot in the plate through which the shaft extends permitting movement of the shaft, the said second lever having its opposite end in hinged connection with an arm of the first lever, the arms of said levers being substantially in such relationship that the pressure applied by the cam to expand the band is also equally applied at the point of the hinged connection of the first named lever with the band, the said levers limiting the extent of rotative movement of the band with the drum.

2. In a vehicle brake, the combination with a brake drum, of a split internal expanding brake band having a socket at a point diametrically opposite the split point, a lever pivoted on the axis of the drum and having an arm terminating in the said socket and an arm at the opposite side of the axis also provided with a socket, a stationarily pivoted lever having an end portion extending into the socket of the first named lever, and an arm extending to between the band ends, a shaft carried by the said arm, a cam on the said shaft engaged by the two ends of the band, and means for turning the shaft and cam to spread the band to engagement with the drum, said band being adapted to turn with the drum.

3. In a vehicle brake, the combination with a brake drum, a stationary axle housing relative to which the drum is rotatable and a stationary plate, of a split internal expanding brake band within the drum, manually operable means for spreading the band at the split point including a cam having a single high point whereby pressure is exerted on one of the said band ends to expand the band, a lever carrying the said cam, a pivot therefor mounted on the said stationary plate, a rock lever pivoted on the stationary axle housing and having an end engaged by the end of the said first named lever on the opposite of the pivot point from the said cam, the opposite end of the said lever engaging the band practically diametrically opposite the split portion of the band, said band being adapted to turn with the drum to an extent permitted by the said levers.

4. In a vehicle brake, the combination with a brake drum, of a brake band adapted to be brought to frictional engagement with the drum, the band being mounted to turn with the drum, the said means including a lever pivoted to turn on the axis of the drum, and a second lever stationarily pivoted, the said second lever carrying and supporting the means for causing frictional engagement of the band with the drum at one end and the opposite end being in hinged relationship with the first lever, said first lever at the opposite end having a hinged connection with the band and the two levers together limiting the extent of movement of the band with the drum and providing a means whereby the pressure in setting the band and the torque developed thereby is applied at two points on the band.

5. In a vehicle brake, the combination with a brake drum, of a brake band adapted to be brought to frictional engagement therewith, mechanism for causing said engagement of the band with the drum comprising two levers mounted on stationary pivots, one of said levers having an arm in hinged relationship with the band at one end and in hinged relationship with the other lever at the other, said other lever carrying at its opposite end means for causing engagement of the band with the drum, said levers limiting the extent of movement of the band with the drum.

6. In a vehicle brake, the combination with a brake drum, of a split expansible band for engaging the drum, an expanding element between the two ends of the band and leverage means actuated through actuation of the expanding element to apply pressure to the band at a point approximately diametrically opposite the split point whereby each half part of the band is caused to engage the drum practically simultaneously in the direction of its rotation, said leverage means limiting the extent of movement of the band with the drum.

7. In a vehicle brake, the combination with a brake drum, of a split expansible band for engaging a drum, an expanding element between the two ends of the band, and a pivoted lever connected with the band at a point approximately diametrically opposite the split point and actuatable through actuation of the expander, the said expander and the said lever causing application of pressure to the band at two points and in the direction of rotation of the band and further limiting the extent of movement of the band with the drum.

In testimony whereof I sign this specification.

JOY S. REYNOLDS.